(12) United States Patent
Esposito (10) Patent No.: US 6,922,518 B2
(45) Date of Patent: Jul. 26, 2005

(54) METHODS AND APPARATUS FOR SEALED FIBER OPTIC FEEDTHROUGHS

(75) Inventor: Gerard A. Esposito, Chelmsford, MA (US)

(73) Assignee: Lighthouse Capital Partners, Greenbrae, CA (US)

( * ) Notice: Subject to any disclaimer, the term of this patent is extended or adjusted under 35 U.S.C. 154(b) by 0 days.

(21) Appl. No.: 10/689,867

(22) Filed: Oct. 21, 2003

(65) Prior Publication Data

US 2004/0136679 A1 Jul. 15, 2004

Related U.S. Application Data

(60) Provisional application No. 60/476,668, filed on Jun. 5, 2003, and provisional application No. 60/433,320, filed on Dec. 13, 2002.

(51) Int. Cl.$^7$ ................................................. G02B 6/00
(52) U.S. Cl. ..................................................... 385/138
(58) Field of Search .......................................... 385/138

(56) References Cited

U.S. PATENT DOCUMENTS

| 4,752,109 | A | * | 6/1988 | Gordon et al. ............... 385/14 |
| 4,904,046 | A | * | 2/1990 | Paschke et al. ............. 385/138 |
| 5,631,990 | A | * | 5/1997 | Hashizume ................... 385/92 |
| 6,284,389 | B1 | | 9/2001 | Jones et al. ................. 428/614 |
| 6,355,362 | B1 | | 3/2002 | Jones et al. ................. 428/614 |
| 2004/0037509 | A1 | * | 2/2004 | Wisecarver ................... 385/55 |

OTHER PUBLICATIONS

International Search Report, Int'l Appl. No. PCT/US03/39455, Nov. 4, 2004, pp. 1–4.

* cited by examiner

*Primary Examiner*—Javaid H. Nasri
(74) *Attorney, Agent, or Firm*—Goodwin Procter LLP (57) ABSTRACT

Methods and apparatus for hermetically sealing an optical fiber in a feedthrough connection. In brief overview, the optical fiber is mounted in a housing whose physical properties differ from that of the fiber by utilizing a structure in accordance with the present invention. The structure, typically in transition bushing form, is formed from at least two materials, such that the physical properties of a first material are selected to match the physical properties of the optical fiber, and the physical properties of a second material are selected to match physical properties of the housing. When the matched physical properties are the coefficients of thermal expansion (CTE) of the fiber and the housing, the result is a fiber optic mounting that remains hermetically sealed despite changes in ambient temperature that would typically induce stresses in the seal, potentially causing its failure.

40 Claims, 5 Drawing Sheets

Transition Bushing
Package
500

KOVAR Solder
Socket

*FIG. 5*

METHODS AND APPARATUS FOR SEALED FIBER OPTIC FEEDTHROUGHS

CROSS-REFERENCE TO RELATED APPLICATIONS

The present application claims the benefit of provisional application No. 60/476,668, filed on Jun. 5, 2003, and provisional application No. 60/433,320, filed on Dec. 13, 2002, the entire disclosures of which are incorporated by reference as if set forth in their entirety herein.

FIELD OF THE INVENTION

The present invention relates generally to seals and more specifically to the sealing of an optical fiber feedthrough connection.

BACKGROUND OF THE INVENTION

Telecommunications devices utilizing optical fibers typically have hermetically-sealed metal housings to protect the internal components of the device from temperature variations, moisture, and other environmental contaminants. These sealed housings have at least one aperture that permits an optical fiber to enter and exit the device. It is desirable to maintain a hermetic seal between the optical fiber and the aperture to prevent those contaminants excluded by the housing from entering through the aperture.

These device housings are typically made from a ferrous material or a non-ferrous metallic material such as titanium alloy, magnesium alloy, or aluminum alloy. The choice of a non-ferrous metallic housing may be advantageous due to a number of design factors, such as weight, heat transfer properties, CTE properties, or configurations. However, the use of a non-ferrous metallic housing prohibits the use of soldering to establish a hermetic seal between the optical fiber and the aperture, since there is a poor CTE match between a glass fiber and a non-ferrous metallic material such as titanium alloy, magnesium alloy, or aluminum alloy. Moreover, non-ferrous alloys are not easily plated and, therefore, are not easily receptive to a solder joint.

A need therefore exists for methods and apparatus that permit the establishment of a hermetic seal between an optical fiber and a non-ferrous metallic housing.

SUMMARY OF THE INVENTION

The present invention relates to methods and apparatus for hermetically sealing an optical fiber in a feedthrough connection. In brief overview, the optical fiber is mounted in a housing whose physical properties differ from that of the fiber by utilizing a structure in accordance with the present invention. The structure, typically in transition bushing form, is formed from at least two materials, such that the physical properties of a first material are selected to match the physical properties of the optical fiber, and the physical properties of a second material are selected to match physical properties of the housing. When the matched physical properties are the coefficients of thermal expansion (CTE) of the fiber and the housing, the result is a fiber optic mounting that remains hermetically sealed despite changes in ambient temperature that would typically induce stresses in the seal, potentially causing its failure.

In one aspect, the present invention provides a method for hermetically sealing an optical fiber including providing an optical fiber, providing a transition bushing, and mounting the fiber in the transition bushing. These individual steps may be performed substantially simultaneously. In one embodiment, mounting the fiber involves metallizing the optical fiber and soldering the metallized fiber to the transition bushing. The fiber is metallized using plasma deposition, electroplating, or both. In another embodiment, mounting the fiber utilizes a glass sealing process. In a further embodiment, the transition bushing is mounted in a housing using, e.g., welding or laser welding.

The transition bushing has a first section and a second section, the first and second sections of the transition bushing having different physical properties. In one embodiment, the first and second sections of the transition bushing have different CTEs. The CTE of a section of the transition bushing is matched to the CTE of a housing for attachment to the transition bushing. The housing and the section with the matching CTE may be formed from welding-compatible materials; the section with the matching CTE may be formed from a non-ferrous material such as titanium alloy, magnesium alloy, or aluminum alloy.

In another aspect, the present invention provides a method for hermetically sealing an optical fiber including providing an optical fiber mounted in a ferrule, providing a transition bushing, and mounting the ferrule in the transition bushing. These individual steps may be performed substantially simultaneously. In one embodiment, mounting the fiber includes soldering the ferrule to a section of the transition bushing. In a further embodiment, the transition bushing is mounted in a housing using, e.g., welding or laser welding.

The ferrule is made of a ferrous alloy. The transition bushing has a first section and a second section, the first and second sections of the transition bushing having different physical properties. In one embodiment, the first and second sections of the transition bushing have different CTEs. The CTE of a section of the transition bushing is matched to the CTE of a housing for attachment to the transition bushing. The housing and the section with the matching CTE may be formed from welding-compatible materials; the section with the matching CTE may be formed from a non-ferrous material such as titanium alloy, magnesium alloy, and aluminum alloy.

In another aspect, the present invention provides a hermetically sealed optical fiber. The optical fiber is mounted in a transition bushing having a first section and a second section, the first and second sections of the transition bushing having different physical properties. The fiber is mounted in the transition bushing using a solder joint or, in another embodiment, using a glass sealing process. In a further embodiment, the transition bushing is mounted in a housing using, e.g., welding or laser welding.

In one embodiment, the first and second sections of the transition bushing have different CTEs. The CTE of a section of the transition bushing is matched to the CTE of a housing for attachment to the transition bushing. The housing and the section with the matching CTE may be formed from welding-compatible materials; the section with the matching CTE may be formed from a non-ferrous material such as titanium alloy, magnesium alloy, or aluminum alloy.

In still another aspect, the present invention provides a hermetically sealed optical fiber. The optical fiber is mounted in a ferrule, the ferrule being mounted in a transition bushing having a first section and a second section having different physical properties. The ferrule is mounted in the transition bushing using a solder joint or, in another embodiment, using a glass sealing process. In a further embodiment, the transition bushing is mounted in a housing using, e.g., welding or laser welding.

The ferrule is made from a ferrous alloy. In one embodiment, the first and second sections of the transition bushing have different CTEs. The CTE of a section of the transition bushing is matched to the CTE of a housing for attachment to the transition bushing. The housing and the section with the matching CTE may be formed from welding-compatible materials; the section with the matching CTE may be formed from a non-ferrous material such as titanium alloy, magnesium alloy, or aluminum alloy.

The foregoing and other features and advantages of the present invention will be made more apparent from the description, drawings, and claims that follow.

BRIEF DESCRIPTION OF THE DRAWINGS

The advantages of the invention may be better understood by referring to the following description taken in conjunction with the accompanying drawings in which.

In the drawings, like reference characters generally refer to corresponding parts throughout the different views. The drawings are not necessarily to scale, emphasis instead being placed on the principles and concepts of the invention.

DETAILED DESCRIPTION OF THE INVENTION

The present invention permits the hermetic sealing of an optical fiber into a non-ferrous metallic housing to exclude external environmental influences—such as moisture, dust, and air—that typically cause problems with the operation of the electro-optical device contained within the housing. When direct mounting of the fiber to the non-ferrous metallic housing is impractical, the use of a bimetallic structure in accordance with the present invention (e.g., in transition bushing form) permits the hermetic sealing of the optical fiber to the housing, as discussed below. This is an exemplary use, as embodiments of the present invention are generally suitable for sealing.

Figure 1:
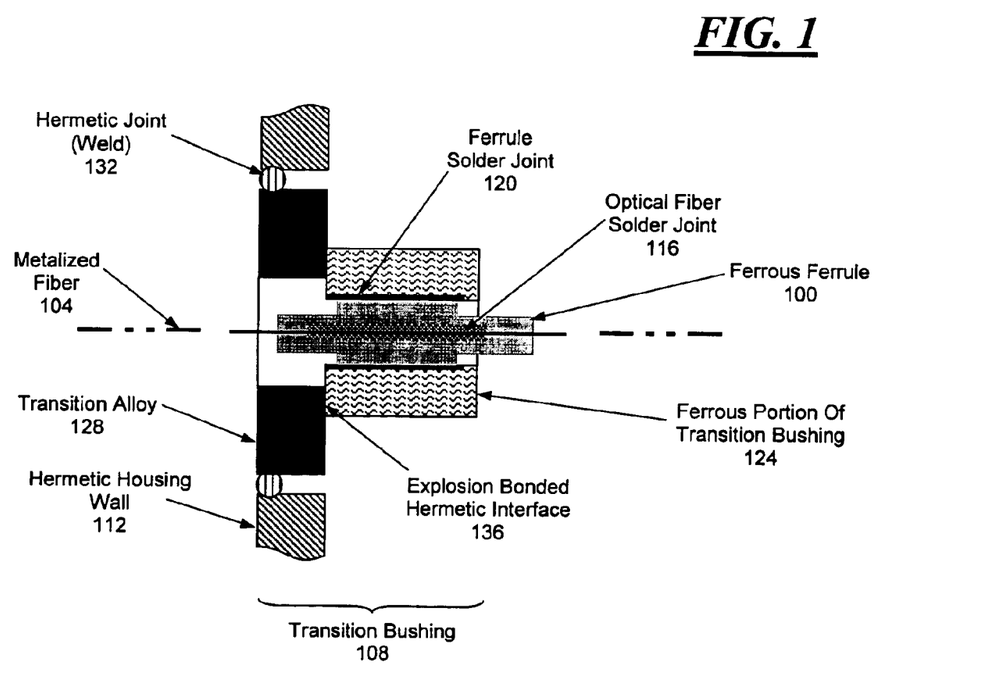
FIG. 1 depicts an embodiment of a transition bushing for hermetically sealing an optical fiber in a feedthrough utilizing a ferrule in accordance with the present invention.

Referring to FIG. 1, in one embodiment of the present invention a ferrule 100 is used to hermetically seal a fiber 104 into a transition bushing 108. The transition bushing 108 is, in turn, hermetically sealed to a housing 112.

In one embodiment, the optical fiber 104 is mounted in the ferrule 100 using a solder technique. First, the surface of the optical fiber 104 is metallized using a suitable plating technique, such as plasma deposition or electroplating. After metallization, the optical fiber 104 is soldered into place in the ferrule 100, forming an optical fiber solder joint 116. Alternately, a fiber 104 is mounted in the ferrule 100 through a glass sealing technique that utilizes an appropriately chosen glass frit material.

The material forming the ferrule 100 is typically selected for a CTE that matches the CTE of the optical fiber 104. Matching CTEs helps maintain the hermetic quality of the seal between the optical fiber 104 and ferrule 100 despite temperature excursions in the ambient environment during installation or operation. Suitable materials for the ferrule 100 include ferrous alloys such as KOVAR. Like the optical fiber 104, the ferrule 100 may be metallized to facilitate its mounting in the transition bushing 108.

The combination of the ferrule 100 and the optical fiber 104 is soldered in place in the transition bushing 108, forming a ferrule solder joint 120. In accordance with the present invention, the transition bushing is fabricated from disparate materials. For example, the bushing 108 in FIG. 1 is formed from a ferrous portion 124 and a transition alloy portion 128.

The materials used in the transition bushing are, in general, selected so that the CTE of each portion of the bushing matches the CTE of the material to which the portion of the bushing is hermetically sealed. For example, the bushing 108 in FIG. 1 has a portion 124 that is soldered to ferrule 100 and another portion 128 that is welded to housing 112, forming a hermetic joint 132. Accordingly, portion 124 of the bushing 108 is fabricated from a ferrous material (such as KOVAR) whose CTE matches the CTE of the ferrule 100. Similarly, portion 128 of the bushing 108 is fabricated from a material whose CTE matches the CTE of the housing 112. Typical materials for portion 128 include titanium alloys, stainless steel alloys, magnesium alloys, aluminum alloys—such as aluminum 4032 or aluminum 4037—and other metal alloys. Matching CTEs helps maintain the hermetic quality of the seals with the bushing 108 despite temperature excursions during installation or operation.

The materials used in the portions of the transition bushing are also typically selected for compatibility with a desired welding technique, such as laser welding. In one embodiment, where the transition alloy portion 128 of the bushing 108 is selected to be a direct alloy match to the housing 112, the transition bushing 108 is joined directly to the housing 112 using conventional joining techniques such as TIG or laser welding.

In one embodiment, the bushing 108 is fabricated from disparate materials using an explosion bonding process, joining the disparate materials and creating a hermetic seal 136 between them. More specifically, this process permits the hermetic joining of, e.g., an aluminum, magnesium, or titanium alloy to a ferrous alloy through the controlled detonation of an explosive charge. In another embodiment, the transition bushing 108 is machined from explosion-bonded bimetallic plate stock, and finished with appropriate plating for subsequent solder operations. The transition bushing 108 is also suited to fabrication using other techniques.

Figure 2:
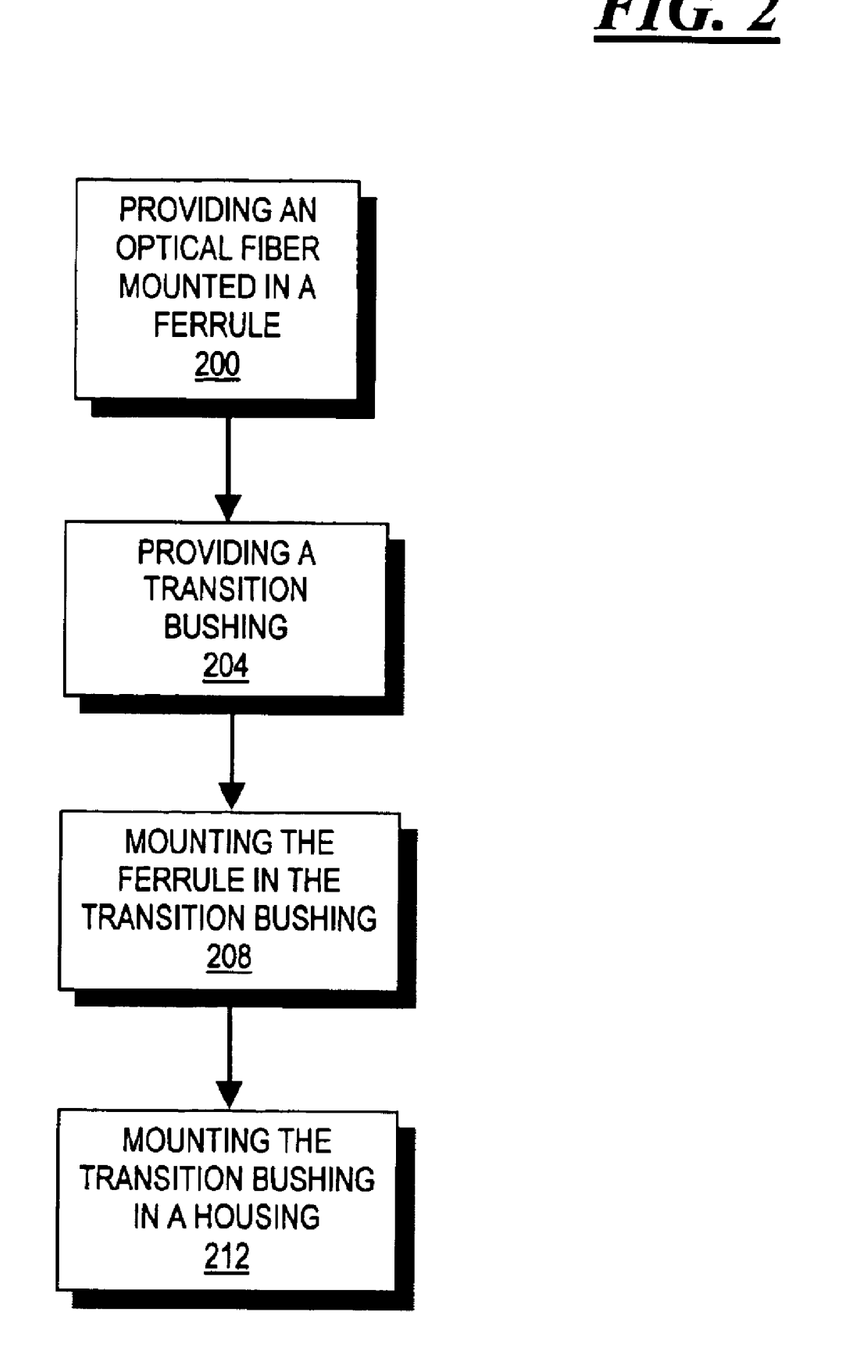
FIG. 2 presents a flowchart of a method for hermetically sealing an optical fiber in a feedthrough utilizing a ferrule and a transition bushing in accordance with the present invention.

FIG. 2 presents a flowchart of an embodiment of a method for hermetically sealing an optical fiber in accordance with the present invention. Referring to FIG. 2 (and still to FIG. 1), an optical fiber 104 mounted in a ferrule 100 is provided (STEP 200). A transition bushing 108 having multiple sections with different physical properties is also provided (STEP 204). The ferrule 100 is mounted in the transition bushing 108 (STEP 208), for example, using a solder joint 120 between the ferrule 100 and a ferrous portion 124 of the transition bushing 108. The transition bushing 108 is mounted in a housing 112 (STEP 212).

In one embodiment, the fiber 104 is sealed in the ferrule 100 using a glass sealing technique (STEP 200). In another embodiment, the fiber 104 is soldered into the ferrule 100, forming a solder joint 116 (STEP 200). In further embodiments, the fiber 104 is metallized or plated before soldering; the ferrule 100 may also be plated or metallized.

As discussed above, the transition bushing 108 is fabricated from disparate materials and selected so that the CTE of each portion of the bushing matches the CTE of the material to which the portion of the bushing is hermetically sealed (STEPS 208 & 212). The materials used in the portions of the transition bushing are also typically selected for compatibility with a desired welding technique, such as laser welding.

In one embodiment, the bushing 108 is fabricated from disparate materials using an explosion bonding process, joining the disparate materials and creating a hermetic seal 136 between them. In another embodiment, the transition bushing 108 is machined from explosion-bonded bimetallic plate stock, and finished with appropriate plating for subsequent solder operations. The transition bushing 108 is also suited to fabrication using other techniques.

Figure 3:
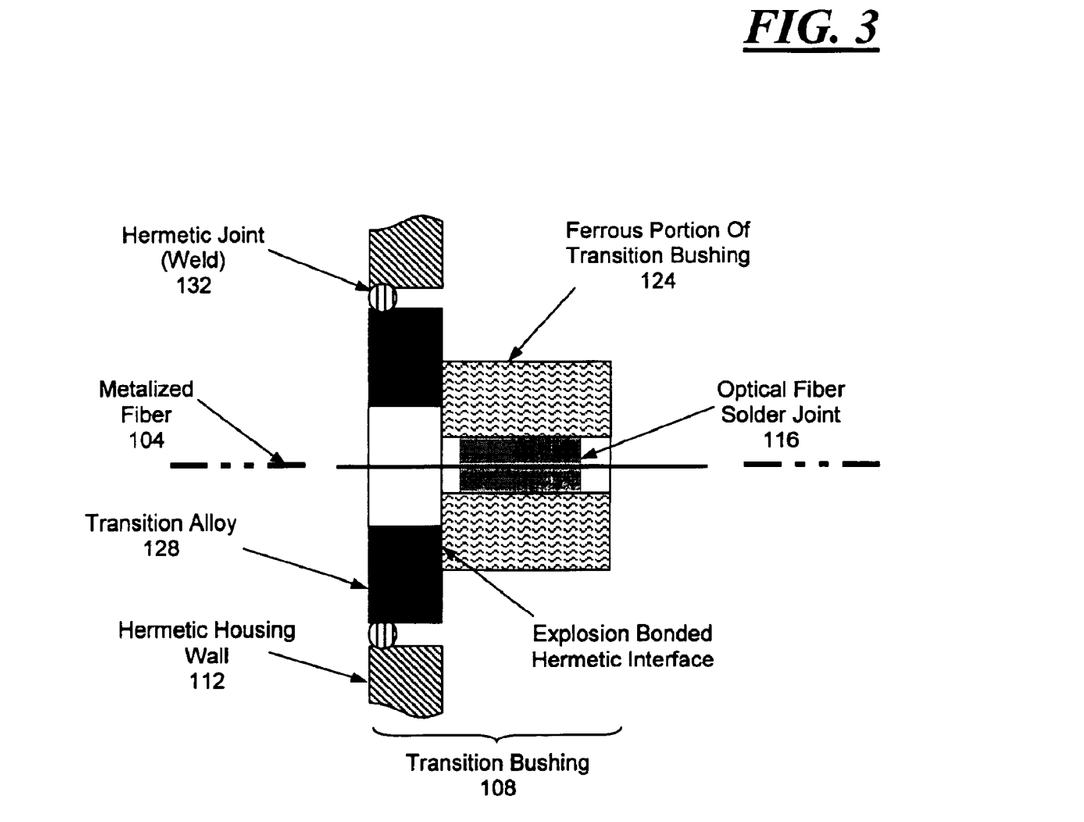
FIG. 3 depicts an embodiment of a transition bushing for directly sealing an optical fiber in a feedthrough in accordance with the present invention.

In another embodiment, shown in FIG. 3, the optical fiber 104 is directly mounted in the transition bushing 108 without using a ferrule. In various embodiments, the fiber 104 is mounted using a soldering technique, a glass sealing technique, or another suitable mounting technique. When a soldering technique is used, the fiber 104 may first be metallized or plated to facilitate the creation of a solder joint 116. The transition bushing 108 is, in turn, hermetically sealed to a housing 112.

As discussed above, the transition bushing 108 is fabricated from disparate materials and selected so that the CTE of each portion of the bushing matches the CTE of the material to which the portion of the bushing is hermetically sealed. The materials used in the portions of the transition bushing are also typically selected for compatibility with a desired welding technique, such as laser welding.

In one embodiment, the bushing 108 is fabricated from disparate materials using an explosion bonding process, joining the disparate materials and creating a hermetic seal 136 between them. In another embodiment, the transition bushing 108 is machined from explosion-bonded bimetallic plate stock, and finished with appropriate plating for subsequent solder operations. The transition bushing 108 is also suited to fabrication using other techniques.

Figure 4:
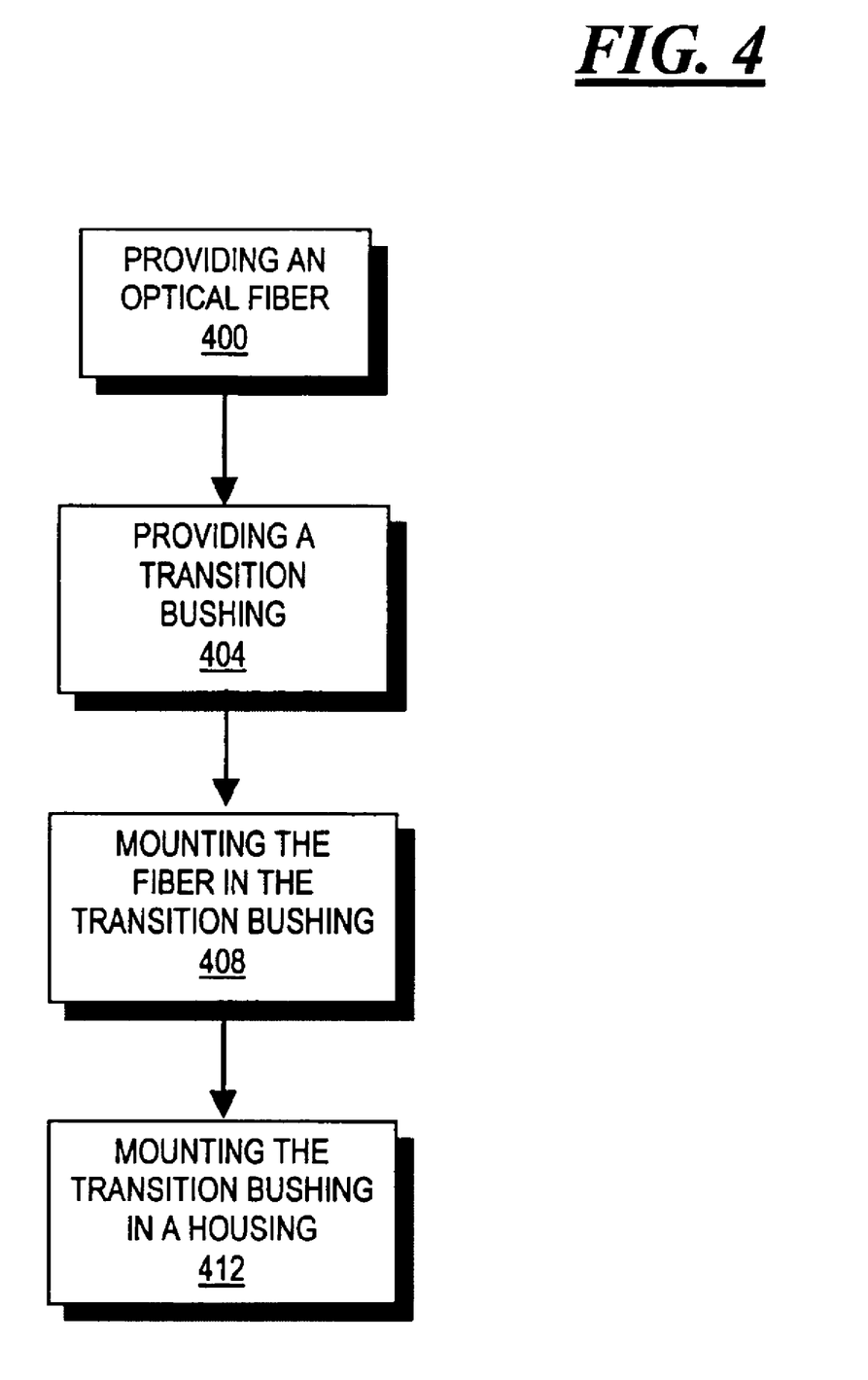
FIG. 4 presents a flowchart of a method for directly sealing an optical fiber in a feedthrough utilizing a transition bushing in accordance with the present invention.

FIG. 4 presents a flowchart of an embodiment of another method for hermetically sealing an optical fiber. Referring to FIG. 4 (and still to FIG. 3)—and in contrast to FIGS. 1 and 2—in this embodiment, the fiber 104 is directly mounted in the transition bushing 108 without utilizing a ferrule. A suitable optical fiber 104 is provided (STEP 400), as is a suitable transition bushing 108 (STEP 404), and the fiber 104 is mounted directly in the transition bushing 108 (STEP 408). The transition bushing 108 is mounted in a housing 112 (STEP 412).

In one embodiment, the fiber 104 is sealed in the bushing 108 using a glass sealing technique (STEP 408). In another embodiment, the fiber 104 is soldered in place in the bushing 108 (STEP 408). In further embodiments, the fiber 104 is metallized or plated before soldering; the bushing 108 may also be metallized.

As discussed above, the transition bushing 108 is fabricated from disparate materials and selected so that the CTE of each portion of the bushing matches the CTE of the material to which the portion of the bushing is hermetically sealed (STEP 408 & 412). The materials used in the portions of the transition bushing are also typically selected for compatibility with a desired welding technique, such as laser welding.

In one embodiment, the bushing 108 is fabricated from disparate materials using an explosion bonding process, joining the disparate materials and creating a hermetic seal between them. In another embodiment, the transition bushing 108 is machined from explosion-bonded bimetallic plate stock, and finished with appropriate plating for subsequent solder operations. The transition bushing 108 is also suited to fabrication using other techniques.

Figure 5:
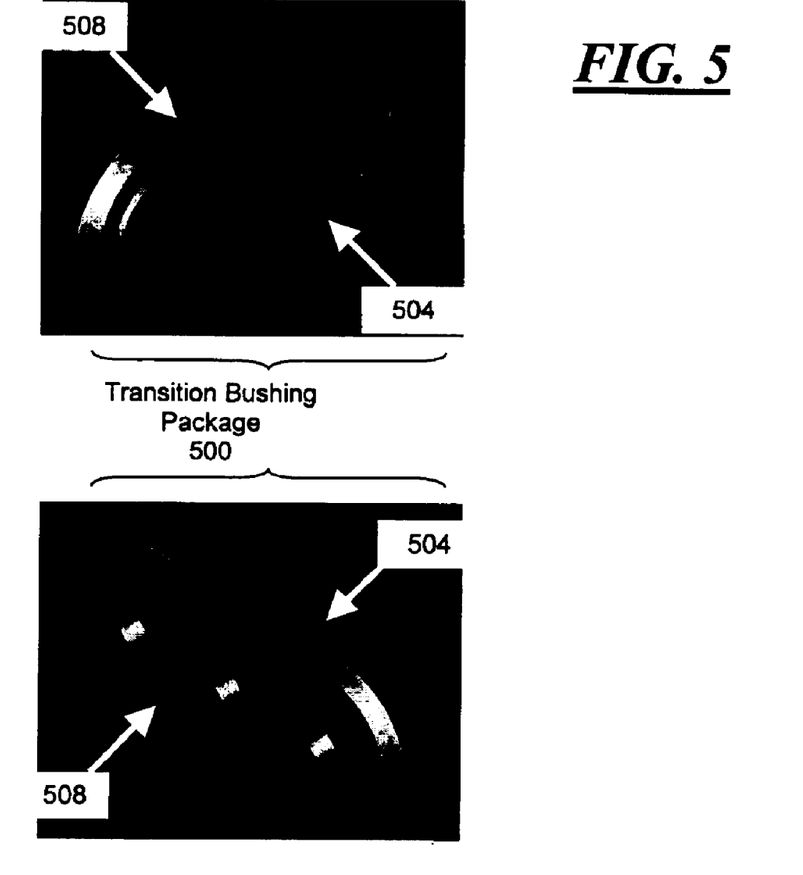
FIG. 5 presents an embodiment of a transition bushing adapted for sealing multiple optical fibers in a feedthrough, utilizing direct sealing or ferrule techniques.

As illustrated in FIG. 5, further embodiments of the present invention provide methods and apparatus for hermetically sealing multiple optical fibers in a single transition bushing package 500. This bushing package 500 allows each fiber to be mounted directly in the package 500 using, e.g., soldering, or indirectly using a ferrule, as discussed above. In one embodiment, some of the fibers are mounted directly in the multi-fiber package 500 while other fibers in the same multi-fiber package 500 are mounted indirectly using ferrules.

The multi-fiber transition bushing package is fabricated from materials having different physical properties. For example, the multi-fiber bushing 500 in FIG. 5 is formed from a ferrous (KOVAR) portion 504 and a transition alloy (e.g., Aluminum alloy 4047) portion 508. The materials used in the multi-fiber transition bushing 500 are, in general, selected so that the CTE of each portion of the bushing matches the CTE of the material to which the portion of the bushing is hermetically sealed. For example, the ferrous portion 504 of the multi-fiber bushing 500 is intended to be hermetically soldered to a ferrule (not shown) or a metallized optical fiber, and the transition alloy portion 508 is intended for welding to a housing (not shown). The material for the ferrous portion 504 is selected for a CTE that matches the CTE of the ferrule or the fiber. The material for the transition alloy portion 508 is selected for a CTE that matches the CTE of the housing. Matching CTEs helps maintain the hermetic quality of the seals with the bushing 500 despite temperature excursions during installation or operation. The materials used for the transition bushing package 500 are also typically selected for compatibility with a desired welding technique, such as laser welding.

In one embodiment, the bushing 500 is fabricated from disparate materials using an explosion bonding process, joining the disparate materials and creating a hermetic seal between them. More specifically, this process permits the hermetic joining of, e.g., an aluminum, magnesium, or titanium alloy to a ferrous alloy through the controlled detonation of an explosive charge. In another embodiment, the transition bushing 500 is machined from explosion-bonded bimetallic plate stock, and finished with appropriate plating for subsequent solder operations. The transition bushing 500 is also suited to fabrication using other techniques.

Many alterations and modifications may be made by those having ordinary skill in the art without departing from the spirit and scope of the invention. Therefore, it must be expressly understood that the illustrated embodiment has been shown only for the purposes of example and should not be taken as limiting the invention, which is defined by the following claims. These claims are thus to be read as not only including literally what is set forth by the claims but also to include those equivalents which are insubstantially different, even though not identical in other respects to what is shown and described in the above illustrations.

What is claimed is:

1. A method for hermetically sealing an optical fiber comprising:
   (a) providing an optical fiber;
   (b) providing a transition bushing having a first section and a second section, the first and second sections of the transition bushing having different physical properties; and
   (c) mounting the fiber in the transition bushing,
   wherein the first and second sections of the transition bushing have different coefficients of thermal expansion, and wherein the coefficient of thermal expansion of a section of the transition bushing is matched to the coefficient of thermal expansion of a housing for attachment to the transition bushing.

2. The method of claim 1, wherein step (c) comprises:
   (c-1) metallizing the optical fiber; and
   (c-2) soldering the metallized fiber to the transition bushing.

3. The method of claim 2 wherein the optical fiber is metallized using at least one of plasma deposition and electroplating.

4. The method of claim 1, wherein step (c) comprises mounting the fiber in the transition bushing using a glass sealing process.

5. The method of claim 1, wherein the section with the matching coefficient of thermal expansion and the housing are formed of welding-compatible materials.

6. The method of claim 1, wherein the section with the matching coefficient of thermal expansion is fashioned from a non-ferrous material.

7. The method of claim 6, wherein the non-ferrous material is one of a titanium alloy, magnesium alloy, and an aluminum alloy.

8. The method of claim 1, wherein steps (a)-(c) are performed substantially simultaneously.

9. The method of claim 1, further comprising mounting the transition bushing in a housing.

10. The method of claim 9, wherein the transition bushing is mounted in the housing using welding.

11. The method of claim 9, wherein the transition bushing is mounted in the housing using laser welding.

12. A method for hermetically sealing an optical fiber comprising:
    (a) providing an optical fiber mounted in a ferrule;
    (b) providing a transition bushing having a first section and a second section, the first and second sections of the transition bushing having different physical properties; and
    (c) mounting the ferrule in the transition bushing,
    wherein the first and second sections of the transition bushing have different coefficients of thermal expansion, and wherein the coefficient of thermal expansion of a section of the transition bushing is matched to the coefficient of thermal expansion of a housing for attachment to the transition bushing.

13. The method of claim 12, wherein the ferrule is made of a ferrous alloy.

14. The method of claim 12, wherein step (c) comprises soldering the ferrule to a section of the transition bushing.

15. The method of claim 12, wherein the section with the matching coefficient of thermal expansion and the housing are formed of welding-compatible materials.

16. The method of claim 12, wherein the section with the matching coefficient of thermal expansion is fashioned from a non-ferrous material.

17. The method of claim 16, wherein the non-ferrous material is one of a titanium alloy, magnesium alloy, and an aluminum alloy.

18. The method of claim 12, wherein steps (a)-(c) are performed substantially simultaneously.

19. The method of claim 12, further comprising mounting the transition bushing in a housing.

20. The method of claim 19, wherein the transition bushing is mounted in the housing using welding.

21. The method of claim 19, wherein the transition bushing is mounted in the housing using laser welding.

22. A hermetically sealed optical fiber comprising:
    an optical fiber;
    a transition bushing having a first section and a second section, the first and second sections of the transition bushing having different physical properties,
    wherein the fiber is mounted in the transition bushing and the first and second sections of the transition bushing have different coefficients of thermal expansion, and wherein the coefficient of thermal expansion of a section of the transition bushing is matched to the coefficient of thermal expansion of a housing for attachment to the transition bushing.

23. The sealed fiber of claim 22, wherein the fiber is mounted in the transition bushing through a solder joint.

24. The sealed fiber of claim 22, wherein the fiber is mounted in the transition bushing through a glass sealing process.

25. The sealed fiber of claim 22, wherein the section with the matching coefficient of thermal expansion and the housing are formed of welding-compatible materials.

26. The sealed fiber of claim 22, wherein the section with the matching coefficient of thermal expansion is fashioned from a non-ferrous material.

27. The sealed fiber of claim 26, wherein the non-ferrous material is one of a titanium alloy, a magnesium alloy, and an aluminum alloy.

28. The sealed fiber of claim 22, wherein the transition bushing is mounted in a housing.

29. The sealed fiber of claim 28, wherein the transition bushing is mounted in the housing using welding.

30. The sealed fiber of claim 28, wherein the transition bushing is mounted in the housing using laser welding.

31. A hermetically sealed optical fiber comprising:
    an optical fiber mounted in a ferrule;
    a transition bushing having a first section and a second section, the first and second sections of the transition bushings having different physical properties,
    wherein the ferrule is mounted in the transition bushing and the first and second sections of the transition bushing have different coefficients of thermal expansion, and wherein the coefficient of thermal expansion of a section of the transition bushing is matched to the coefficient of thermal expansion of a housing for attachment to the transition bushing.

32. The sealed fiber of claim 31, wherein the ferrule is made of a ferrous alloy.

33. The sealed fiber of claim 31, wherein the ferrule is mounted in the transition bushing through a solder joint.

34. The sealed fiber of claim 31, wherein the ferrule is mounted in the transition bushing through a glass sealing process.

35. The sealed fiber of claim 31, wherein the section with the matching coefficient of thermal expansion and the housing are formed of welding-compatible materials.

36. The sealed fiber of claim 35, wherein the section with the matching coefficient of thermal expansion is fashioned from a non-ferrous material.

37. The sealed fiber of claim 36, wherein the non-ferrous material is at least one of a titanium alloy, a magnesium alloy, and an aluminum alloy.

38. The sealed fiber of claim 31, wherein the transition bushing is mounted in a housing.

39. The sealed fiber of claim 38, wherein the transition bushing is mounted in the housing using welding.

40. The sealed fiber of claim 38, wherein the transition bushing is mounted in the housing using laser welding.

* * * * *